(12) United States Patent
Usami et al.

(10) Patent No.: US 10,509,928 B2
(45) Date of Patent: Dec. 17, 2019

(54) INFORMATION COLLECTION SYSTEM

(71) Applicants: FUJIFILM Corporation, Tokyo (JP); THE UNIVERSITY OF TOKYO, Tokyo (JP)

(72) Inventors: Yoshihisa Usami, Kanagawa (JP); Takayoshi Yokoyama, Tokyo (JP); Yuki Owashi, Tokyo (JP); Hiroyuki Matsui, Tokyo (JP); Junichi Takeya, Tokyo (JP)

(73) Assignees: FUJIFILM Corporation, Tokyo (JP); THE UNIVERSITY OF TOKYO, Tokyo (JP)

(*) Notice: Subject to any disclaimer, the term of this patent is extended or adjusted under 35 U.S.C. 154(b) by 0 days.

(21) Appl. No.: 16/041,864

(22) Filed: Jul. 23, 2018

(65) Prior Publication Data
US 2019/0005282 A1   Jan. 3, 2019

Related U.S. Application Data

(63) Continuation of application No. PCT/JP2017/001482, filed on Jan. 18, 2017.

(30) Foreign Application Priority Data

Jan. 29, 2016 (JP) .................. 2016-015711

(51) Int. Cl.
G06K 7/10 (2006.01)

(52) U.S. Cl.
CPC ..... G06K 7/10029 (2013.01); G06K 7/10069 (2013.01); G06K 7/10148 (2013.01); G06K 7/10297 (2013.01)

(58) Field of Classification Search
CPC .. G06K 7/10029; G06K 7/10; G06K 7/10069; G06K 7/10148; G06K 7/10297; G06K 19/07; H04B 1/59
(Continued)

(56) References Cited

U.S. PATENT DOCUMENTS 6,362,738 B1 * 3/2002 Vega .................... G06K 7/0008
                                                    340/10.1
6,480,143 B1   11/2002 Kruger et al.
(Continued)

FOREIGN PATENT DOCUMENTS

EP        1001366 A2    5/2000
JP     2000-230978 A    8/2000
(Continued)

OTHER PUBLICATIONS

An Office Action; "Notification of Reasons for Refusal," issued by the Japanese Patent Office dated Dec. 4, 2018, which corresponds to Japanese Patent Application No. 2017-564189 and is related to U.S. Appl. No. 16/041,864 with an English Translation.
(Continued)

*Primary Examiner* — Yong Hang Jiang
(74) *Attorney, Agent, or Firm* — Studebaker & Brackett PC

(57) ABSTRACT

An information collection system includes a plurality of radio tags and a reading device. Each of the radio tags stores identification information and includes a sensor, an antenna that receives a carrier wave from the reading device, and a data transmission unit that sends measurement data including the identification information and information obtained by the sensor to the reading device after the carrier wave is received by the antenna. The plurality of radio tags send the identification information and the information obtained by the sensor with different natural periods from the data transmission units. The reading device transmits the carrier wave to each of the radio tags, receives data from each of the radio tags, and obtains the data.

10 Claims, 4 Drawing Sheets

(58) Field of Classification Search
USPC .............................................. 340/10.1, 10.2
See application file for complete search history.

(56) References Cited

U.S. PATENT DOCUMENTS

| | | | | |
|---|---|---|---|---|
| 8,487,767 | B2* | 7/2013 | Inano | G06K 7/0008 340/10.41 |
| 2003/0214389 | A1* | 11/2003 | Arneson | G06K 7/0008 340/10.1 |
| 2008/0072423 | A1* | 3/2008 | Finn | G06K 19/07327 29/854 |
| 2012/0092132 | A1* | 4/2012 | Holme | A01K 11/008 340/10.1 |
| 2015/0054621 | A1 | 2/2015 | Lin et al. | |
| 2018/0255373 | A1* | 9/2018 | Koezuka | H04Q 9/00 |
| 2018/0307872 | A1* | 10/2018 | Usami | H04B 5/02 |

FOREIGN PATENT DOCUMENTS

| | | |
|---|---|---|
| JP | 2008-024385 A | 2/2005 |
| JP | 2005-117578 A | 4/2005 |
| JP | 2007-183813 A | 7/2007 |
| JP | 2010-182217 A | 8/2010 |
| JP | 2018147136 A * | 9/2018 |

OTHER PUBLICATIONS

International Search Report issued in PCT/JP2017/001482; dated Feb. 21, 2017.
Written Opinion issued in PCT/JP2017/001482; dated Feb. 21, 2017.
International Preliminary Report on Patentability issued in PCT/JP2017/001482; dated Jul. 31, 2018.
Extended European Search Report issued by the European Patent Office dated Jan. 11, 2019, which corresponds to EP17744037.7-1202 and is related to U.S. Appl. No. 16/041,864.

* cited by examiner

INFORMATION COLLECTION SYSTEM

CROSS-REFERENCE TO RELATED APPLICATIONS

This application is a Continuation of PCT International Application No. PCT/JP2017/001482 filed on Jan. 18, 2017, which claims priority under 35 U.S.C. § 119(a) to Japanese Patent Application No. 2016-015711 filed on Jan. 29, 2016. The above application is hereby expressly incorporated by reference, in its entirety, into the present application.

BACKGROUND OF THE INVENTION

1. Field of the Invention

The present invention relates to an information collection system including a plurality of radio tags, and more particularly, to an information collection system that obtains information from a plurality of radio tags without a command signal.

2. Description of the Related Art

In recent years, a technique has been known which provides a radio tag that is called, for example, an integrated circuit tag (IC tag), an electronic tag, or a radio frequency identification (RFID) tag in an object, reads information recorded on the radio tag with a reading device, and recognizes various kinds of information related to the object.

For example, in an item management system disclosed in JP2008-24385A, a radio IC tag with a sensor which is attached to an item measures the ambient temperature of the item and autonomously transmits ambient temperature data to a logging device whenever measuring the ambient temperature. The logging device stores and holds the ambient temperature data transmitted from the radio IC tag with a sensor in a memory. Then, in a case in which an information processing device is connected, the logging device outputs the ambient temperature data stored and held in the memory to the information processing device.

The radio IC tag with a sensor has a watchdog timer function. The radio IC tag with a sensor measures the ambient temperature of an item at a predetermined time using the watchdog timer function and autonomously transmits ambient temperature data to the logging device whenever measuring the ambient temperature. Therefore, the radio IC tag with a sensor does not need to receive, for example, a request signal for transmitting the ambient temperature data to the logging device from the logging device.

The ambient temperature data of the item measured by the radio IC tag with a sensor is stored in a memory of the logging device so as to be associated with the identification (ID) information of the radio IC tag with a sensor which is the transmission source of the ambient temperature data. Therefore, in a case in which the ID of the radio IC tag with a sensor and the item to which the radio IC tag with a sensor is added are managed so as to be associated with each other, it is possible to store the ambient temperature data of the items measured by a plurality of radio IC tags with a sensor such that the items can be specified.

SUMMARY OF THE INVENTION

In the item management system disclosed in JP2008-24385A, in a case in which the ID of the radio IC tag with a sensor and the item to which the radio IC tag with a sensor is attached are managed so as to be associated with each other, it is possible to store the ambient temperature data of the items measured by a plurality of radio IC tags with a sensor such that the items can be specified. However, since the radio IC tag with a sensor does not need to receive, for example, a request signal for transmitting ambient temperature data to the logging device from the logging device, the radio IC tag with a sensor needs to have the watchdog timer function as a configuration. As a result, the configuration of the radio IC tag with a sensor becomes complicated and costs increase.

An object of the invention is to provide an information collection system that can solve the above-mentioned problems of the related art, can obtain information from a plurality of radio tags without a command signal, and has a simple configuration and a low cost.

In order to achieve the object, there is provided an information collection system comprising a plurality of radio tags and a reading device. Each of the radio tags stores identification information and includes a sensor, an antenna that receives a carrier wave from the reading device, and a data transmission unit that sends measurement data including the identification information and information obtained by the sensor to the reading device after the carrier wave is received by the antenna. The plurality of radio tags send the identification information and the information obtained by the sensor with different natural periods from the data transmission units. The reading device transmits the carrier wave to each of the radio tags, receives the measurement data from each of the radio tags, and obtains the measurement data.

Preferably, the information collection system further comprises a storage device and the measurement data obtained by the reading device from the plurality of radio tags is stored in the storage device.

Preferably, the information collection system further comprises an information terminal that reads the identification information of the radio tag and reads the information obtained by the sensor of the radio tag, whose identification information has been read, from the storage device in time series.

Preferably, in a case in which the number of radio tags is n, a time when the measurement data is sent is $t_d$, and the natural period of the radio tag is T, $(n^2-n) \times t_d \leq T$ is satisfied.

A carrier frequency of the carrier wave of the reading device is preferably equal to or greater than 13 MHz, more preferably equal to or greater than 13.56 MHz, and most preferably 400 MHz, 900 MHz, and 2 GHz.

Preferably, the radio tag includes a transistor in which a semiconductor layer is made of an organic semiconductor.

According to the invention, it is possible to obtain information from a plurality of radio tags without a command signal, to simplify the configuration of the radio tag, and to reduce the cost of the radio tag.

DESCRIPTION OF THE PREFERRED EMBODIMENTS

Hereinafter, an information collection system according to the invention will be described in detail on the basis of a preferred embodiment illustrated in the accompanying drawings.

In the following description, "to" indicating a value range includes the upper and lower limits of the range. For example, in a case in which ε is in the range from a value α to a value β, the range of ε includes the value α and the value β, which is mathematically represented by $\alpha \leq \varepsilon \leq \beta$.

Figure 1:
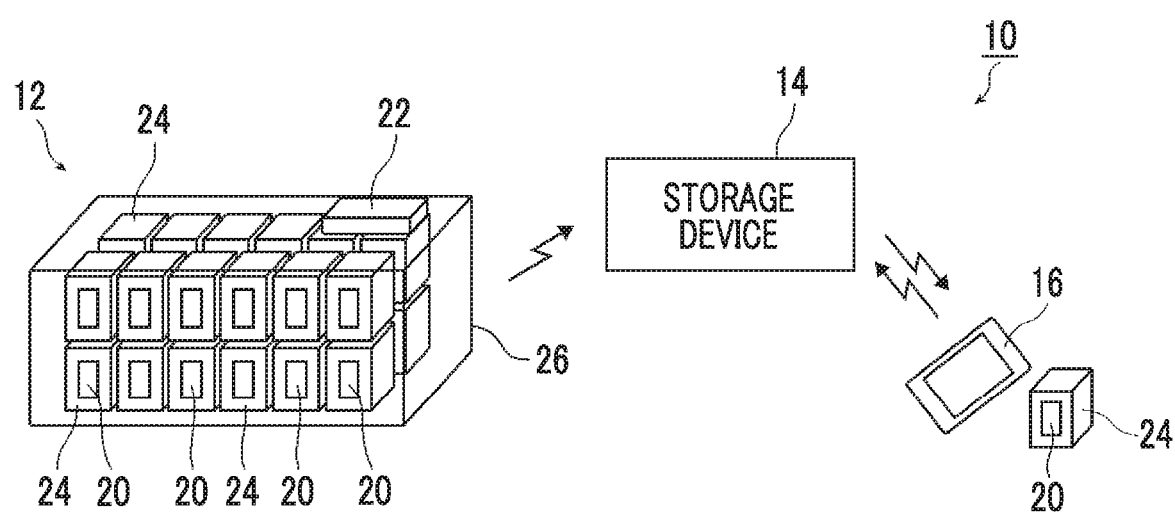
FIG. 1 is a diagram schematically illustrating an information collection system according to an embodiment of the invention.

FIG. 1 is a diagram schematically illustrating an information collection system according to an embodiment of the invention.

An information collection system 10 illustrated in FIG. 1 includes an information collection unit 12, a storage device 14, and an information terminal 16. The information collection unit 12 and the storage device 14 are connected to each other wirelessly or in a wired manner. The storage device 14 and the information terminal 16 are connected to each other wirelessly or in a wired manner.

In the information collection system 10, various kinds of information which have been obtained from a radio tag 20 and have been collected by the information collection unit 12 are stored in the storage device 14. Various kinds of information stored in the storage device 14 can be seen through the information terminal 16.

The storage device 14 is not particularly limited as long as it can store various kinds of information which have been obtained from the radio tag 20 and have been collected by the information collection unit 12 and can transmit and receive data to and from the information collection unit 12 and the information terminal 16. The storage device 14 may be hardware, such as a server, or may be constructed on the Internet such as a cloud.

In the storage device 14, various kinds of information obtained from the radio tag 20 are stored in time series for each identification information item of the radio tag 20.

The configuration of the information terminal 16 is not particularly limited as long as the information terminal 16 can acquire the identification information of the radio tag 20 and can acquire the information which has been acquired from the radio tag 20, whose identification information has been acquired, and then stored in the storage device 14 from the storage device 14. For example, the information terminal 16 may have a function of communicating with the radio tag 20 in order to acquire the identification information of the radio tag 20 and a function of communicating with the storage device 14 in order to acquire information from the storage device 14 and may include a display unit that visually displays the information stored in the storage device 14. Therefore, for example, an application for communication with the radio tag 20 and an application for communication with the storage device 14 are incorporated into a tablet personal computer or a smart phone such that the tablet personal computer or the smart phone can be used as the information terminal 16. In addition, the information terminal 16 may be a dedicated terminal that has the two communication functions implemented by hardware and software and includes the display unit which can visually display the information stored in the storage device 14.

In a case in which the identification information of the radio tag 20 is attached as a data code (not illustrated) to the radio tag 20, the information terminal 16 includes an imaging unit for reading the data code and image analysis software for recognizing the image of the data code acquired by the imaging unit.

The data code is, for example, a bar code, characters, a symbol, or a combination of characters and a symbol. The data code is formed by, for example, printing.

The information collection unit 12 includes a plurality of radio tags 20 and a reading device 22.

For example, a plurality of containers 24 are accommodated in a case 26. The radio tag 20 is provided in each container 24. For example, the reading device 22 is accommodated in the case 26.

The container 24 is not particularly limited and contains, for example, foods or beverages.

Figure 2:
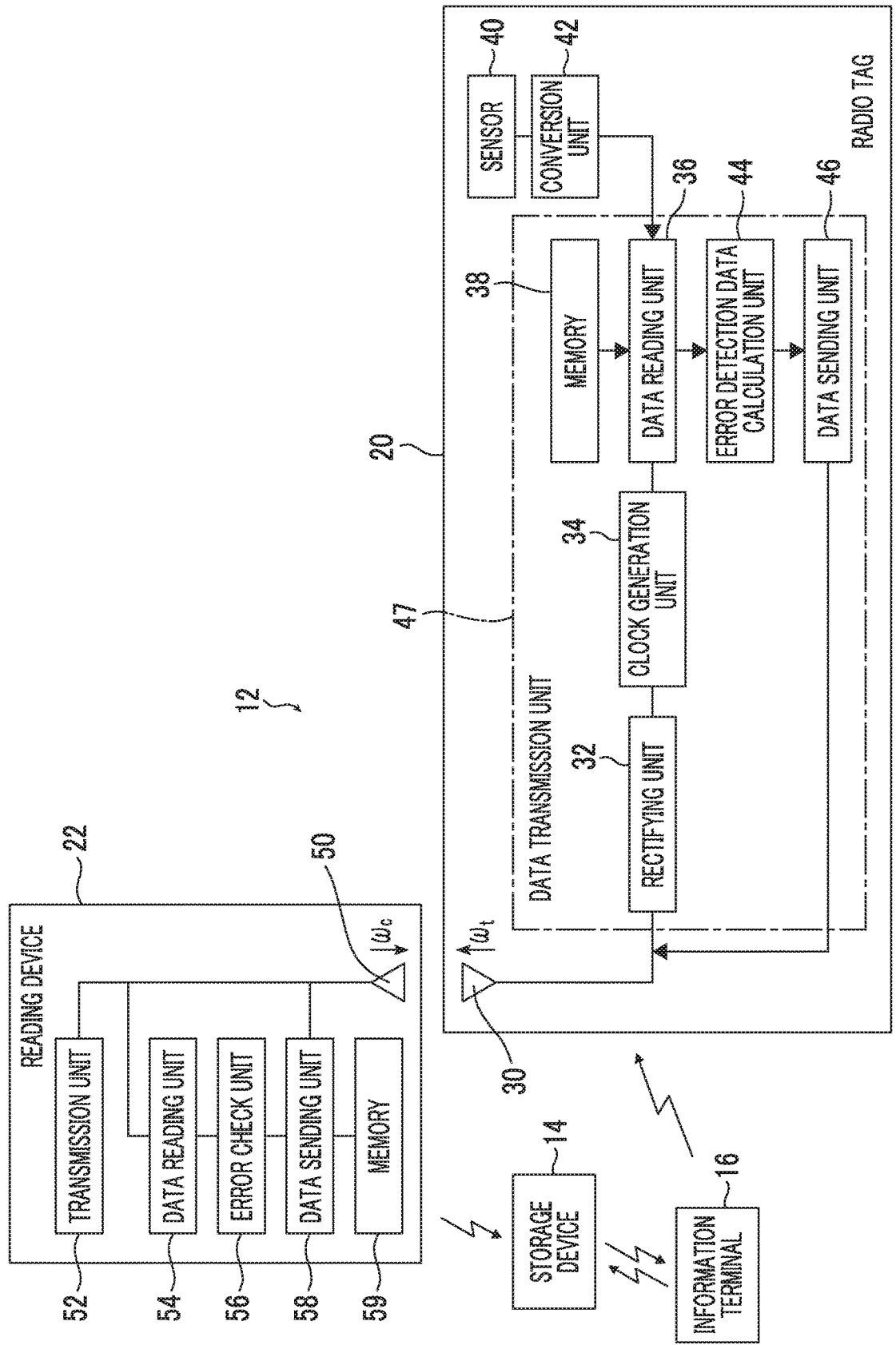
FIG. 2 is a diagram schematically illustrating the configuration of the information collection system according to the embodiment of the invention.

Here, FIG. 2 is a diagram schematically illustrating the configuration of the information collection system according to the embodiment of the invention.

The radio tag 20 illustrated in FIG. 2 is a passive type, receives a power radio wave, that is, a carrier wave ωc from the reading device 22, operates, and sends measurement data including the identification information of the radio tag 20 and information obtained by a sensor 40 to the reading device 22 with a natural period. The radio tags 20 have different natural periods. Therefore, the reading device 22 can acquire various kinds of information from the plurality of radio tags 20. Hereinafter, the measurement data including the identification information of the radio tag 20 and the information obtained by the sensor 40 is simply referred to as measurement data.

The radio tag 20 includes an antenna 30, a rectifying unit 32, a clock generation unit 34, a data reading unit 36, a memory 38, the sensor 40, a conversion unit 42, an error detection data calculation unit 44, and a data sending unit 46. The rectifying unit 32, the clock generation unit 34, the data reading unit 36, the memory 38, the error detection data calculation unit 44, and the data sending unit 46 form a data transmission unit 47.

The antenna 30 is connected to the rectifying unit 32, and the rectifying unit 32 is connected to the clock generation unit 34. The clock generation unit 34 is connected to the data reading unit 36. The memory 38 is connected to the data reading unit 36. The sensor 40 is connected to the data reading unit 36 through the conversion unit 42. In addition, the error detection data calculation unit 44 is connected to the data reading unit 36, and the data sending unit 46 is connected to the error detection data calculation unit 44.

The antenna 30 is used to receive the carrier wave we for power supply from the reading device 22 and to transmit a radio wave wt from the radio tag 20. The configuration of the antenna 30 is not particularly limited as long as it can receive the carrier wave we from the reading device 22 and transmit the radio wave wt from the radio tag 20, and various known antennas can be used.

The carrier wave we for power supply from the reading device 22 is, for example, an alternating-current radio wave with a frequency of 13.56 MHz. The frequency of the carrier wave ωc is not limited to 13.56 MHz and is appropriately set according to, for example, the configuration of the radio tag 20. The frequency of the carrier wave ωc is preferably equal to or greater than 13 MHz and more preferably 400 MHz, 900 MHz, and 2 GHz.

The rectifying unit 32 converts the carrier wave ωc which has been transmitted from the reading device 22 and then received by the antenna 30 into a direct-current voltage and obtains a power supply voltage of the radio tag 20. The rectifying unit 32 includes, for example, two rectifying transistors (not illustrated) and a capacitor (not illustrated). The capacitor is an output capacitor which accumulates charge. In the rectifying unit 32, the two rectifying transistors are connected in series to each other and the capacitor is connected in parallel to the rectifying transistors connected in series to each other. In the two rectifying transistors connected in series to each other, the end of the rectifying transistor is grounded and the end of the rectifying transistor is connected to the clock generation unit 34. In this way, the direct-current voltage obtained by the rectifying unit 32 can be supplied to the clock generation unit 34. The rectifying unit 32 is not limited to the above-mentioned configuration as long as it can convert the carrier wave ωc from the reading device 22 into a direct-current voltage.

The clock generation unit 34 generates a clock signal of the radio tag 20. The clock generation unit 34 includes, for example, an oscillation circuit (not illustrated). The oscillation circuit generates the clock signal. The clock generation unit 34 is not limited to the oscillation circuit as long as it can generate the clock signal. A frequency dividing circuit (not illustrated) may generate the clock signal. The measurement data is sent on the basis of the clock signal. The frequency of the clock signal is, for example, 20 kHz. However, the frequency is not particularly limited to 20 kHz.

The data reading unit 36 reads the identification information stored in the memory 38 and acquires the information obtained by the sensor 40 from the conversion unit 42. In addition, the data reading unit 36 outputs the read identification information stored in the memory 38 and the information obtained by the sensor 40 to the error detection data calculation unit 44.

The configuration of the data reading unit 36 is not particularly limited as long as the data reading unit 36 has the above-mentioned functions.

The memory 38 stores the identification information of the radio tag 20. In addition, the memory 38 stores the information obtained by the sensor 40. The memory 38 is not particularly limited as long as it can store the identification information of the radio tag 20 and the information obtained by the sensor 40. A rewritable memory is used as the memory 38. The configuration of the memory 38 is not particularly limited and various known memories can be used.

A sensor corresponding to the purpose of the information collection system 10 can be appropriately used as the sensor 40. The sensor 40 is, for example, a temperature sensor. The sensor 40 is not limited to the temperature sensor. For example, a pressure sensor, an optical sensor, an illuminance sensor, a humidity sensor, a gas sensor, an ultrasound sensor, a water sensor, a radiation sensor, a magnetic sensor, an odor sensor, a pH (hydrogen ion concentration index) sensor, a turbidity sensor, an altitude sensor, and an acceleration sensor can be used. The number of sensors 40 is not limited to 1. A plurality of sensors 40 may be used or a plurality of combinations of the above-mentioned various sensors may be used.

The conversion unit 42 converts an analog signal obtained by the sensor 40 into a digital signal. The configuration of the conversion unit 42 is not particularly limited as long as the conversion unit 42 can convert an analog signal into a digital signal. The conversion unit 42 includes, for example, an 8-bit analog/digital conversion circuit. In a case in which the sensor 40 can output a digital signal, the conversion unit 42 may not be provided.

The error detection data calculation unit 44 performs data calculation for error detection for the identification information stored in the memory 38 and the information obtained by the sensor 40 sent from the data reading unit 36. For example, a parity check method is used as the data calculation for error detection and a test bit is added to data. In addition, the error detection data calculation unit 44 adds a start of frame (SOF) that is required as a data start signal in the reading device 22 in series to the head of the data of the identification information and the information obtained by the sensor 40 and adds an end of frame (EOF) that is required as a data end signal in series to the end of the data of the information. As such, the error detection data calculation unit 44 processes data into a data format that can be read by the reading device 22, obtains the above-mentioned measurement data, and outputs the measurement data to the data sending unit 46.

The data sending unit 46 sends the measurement data as the radio wave ωt to the reading device 22 through the antenna 30. The data sending unit 46 modulates the measurement data and sends the measurement data as the radio wave ωt from the antenna 30 on the basis of the clock signal of the clock generation unit 34. The radio tag 20 is not provided with a power supply and receives the carrier wave ωc from the reading device 22. The rectifying unit 32 obtains a direct-current voltage and the clock generation unit 34 is driven to count the clocks of the clock signal. The radio tag 20 repeatedly sends data with the natural period until the clock generation unit 34 is not capable of being driven with the direct-current voltage obtained by the rectifying unit 32.

The radio tag 20 has a configuration without a power supply. However, the invention is not limited thereto. For example, a power supply may be provided and output may increase when data is sent from the data sending unit 46. In this case, a data sending range can be wider than that in a case in which the power supply is not provided.

For example, the natural periods are written to each radio tag 20 in order to check whether or not the natural period of a radio tag 20 is equal to the natural periods of other radio tags 20. A method for writing the natural period is not particularly limited. The natural period may be simply numbers or may be a data code (not illustrated) such as a bar code, as in the identification information. In a case in which numbers are written as the natural period, it is possible to visually check the natural period. In a case in which the natural period is a data code such as a bar code, a scanner can read the natural period and a computer can acquire the reading result to determine whether or not the natural periods of a plurality of radio tags 20 are equal to each other.

Next, the reading device 22 will be described.

The reading device 22 includes an antenna 50, a transmission unit 52, a data reading unit 54, an error check unit 56, a data sending unit 58, and a memory 59. The transmission unit 52 is connected to the antenna 50. In addition, the data reading unit 54 is connected to the antenna 50, and the error check unit 56 is connected to the data reading unit 54. The data sending unit 58 is connected to the error check unit 56. The memory 59 is connected to the data sending unit 58.

The antenna 50 is used to transmit and receive data to and from the radio tag 20 and is used to transmit data to the storage device 14. The configuration of the antenna 50 is not particularly limited as long as the antenna 50 has the above-mentioned functions and various known antennas can be used as the antenna 50.

The transmission unit 52 includes an oscillation circuit (not illustrated) that oscillates the carrier wave ωc for supplying power to the radio tag 20. The configuration of the oscillation circuit is not particularly limited as long as the oscillation circuit can supply the carrier wave ωc to the radio tag 20. For example, a radio frequency (RF) circuit can be used. The carrier wave ωc is oscillated by the transmission unit 52 and is transmitted to a plurality of radio tags 20 through the antenna 50 at the same time.

The data reading unit 54 converts the radio wave ωt which has been transmitted from the radio tag 20 and received by the antenna 50 into a format that can be used by the reading device 22 and reads the measurement data. Specifically, the data reading unit 54 demodulates the measurement data transmitted from the radio tag 20 into data that can be used by the error check unit 56 and reads the measurement data between the SOF and the EOF added by the error detection data calculation unit 44. A demodulation method is not particularly limited and various known demodulation methods can be used.

The error check unit 56 checks whether there is an error in the measurement data which has been transmitted from the radio tag 20 and then demodulated by the data reading unit 54. As described above, the error detection data calculation unit 44 of the radio tag 20 adds a check bit to data using the parity check method. Therefore, the error check unit 56 uses, for example, a parity check method as the error check method. A known method can be used as the error detection method using the parity check method.

In a case in which the error check unit 56 detects no error, the measurement data transmitted from the radio tag 20 is stored in the storage device 14. On the other hand, in a case in which the error check unit 56 detects an error, the measurement data transmitted from the radio tag 20 is not stored in the storage device 14.

In a case in which an error is detected from the data, the error check unit 56 raises a flag in the data. Here, the term "raising a flag" means that a "flag field" is set in data and the value of the "flag field" is set to "1". Data in which the value of the "flag field" is "0" is stored in the storage device 14. Whether data is stored in the storage device 14 can be represented by one bit "0" or "1". Data may be stored in the memory 59, regardless of the value of the "flag field", and data in which the value of the "flag field" is "0" may be stored in the storage device 14.

The data sending unit 58 stores the measurement data which has been transmitted from the radio tag 20 and determined not to have an error by the error check unit 56 in the storage device 14. In a case in which the reading device 22 and the storage device 14 are connected to each other in a wired manner, the data sending unit 58 converts the measurement data transmitted from the radio tag 20 into a data format that can be stored in the storage device 14 and outputs the measurement data to the storage device 14.

On the other hand, in a case in which the reading device 22 and the storage device 14 are wirelessly connected to each other, the data sending unit 58 modulates the measurement data transmitted from the radio tag 20 into a data format that can be transmitted by the antenna 50. A modulation method is not particularly limited and various known modulation methods can be used. The storage device 14 receives the data transmitted from the data sending unit 58 and, for example, stores the information obtained by the sensor 40 in time series for each unique information item of the radio tags 20. In this way, for example, the information obtained by the sensor 40 can be seen as time-series data through the information terminal 16.

In the reading device 22, the data sending unit 58 may convert data into a data format that can be stored in the storage device 14 and may store the data in the memory 59. In this case, the memory 59 may be a detachable memory such as a memory card or a universal serial bus (USB) flash drive. In this case, the data to be stored in the storage device 14 can be collectively stored in the storage device 14. In addition, the memory 59 may not be provided.

The interval at which data is sent from the data sending unit 58 of the reading device 22 is not particularly limited and may be appropriately set. For example, the interval may be sent once per 2 hours.

The reading device 22 transmits the carrier wave ωc to the plurality of radio tags 20 at the same time. Since the plurality of radio tags 20 have different natural periods, they send data at different times after receiving the carrier wave ωc. Therefore, the reading device 22 can collect the data from the plurality of radio tags 20.

After receiving the carrier wave ωc, the radio tag 20 repeatedly sends the measurement data with the natural period as long as it is driven by the direct-current voltage obtained by the carrier wave ωc.

In the information collection system 10, the reading device 22 can obtain data from the plurality of radio tags 20 only by transmitting the carrier wave ωc to the plurality of radio tags 20, without transmitting a command signal. The radio tag 20 is driven by the direct-current voltage obtained from the carrier wave ωc, has a simple configuration, and has a low cost.

The time when the reading device 22 transmits the carrier wave ωc is appropriately determined according to, for example, the purpose and is changed if necessary. For example, the reading device 22 transmits the carrier wave ωc once per hour. The radio tag 20 continuously transmits data as long as it is driven by the direct-current voltage obtained from the carrier wave ωc once per hour.

Next, the operation of the information collection system 10 will be described using three radio tags 20a, 20b, and 20c as an example. An example in which the sensors 40 of the three radio tags 20a, 20b, and 20c are temperature sensors and both temperature information and identification information are sent as the measurement data will be described.

Figure 3:
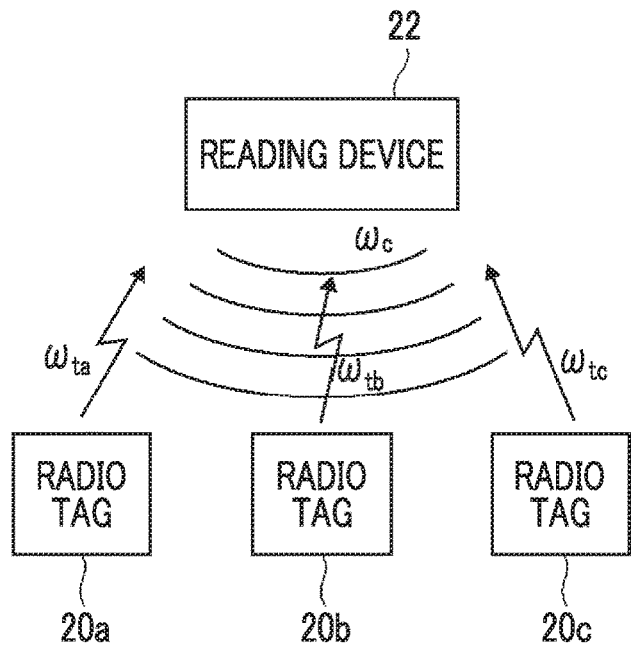
FIG. 3 is a diagram schematically illustrating the operation of the information collection system according to the embodiment of the invention.
Figure 4:
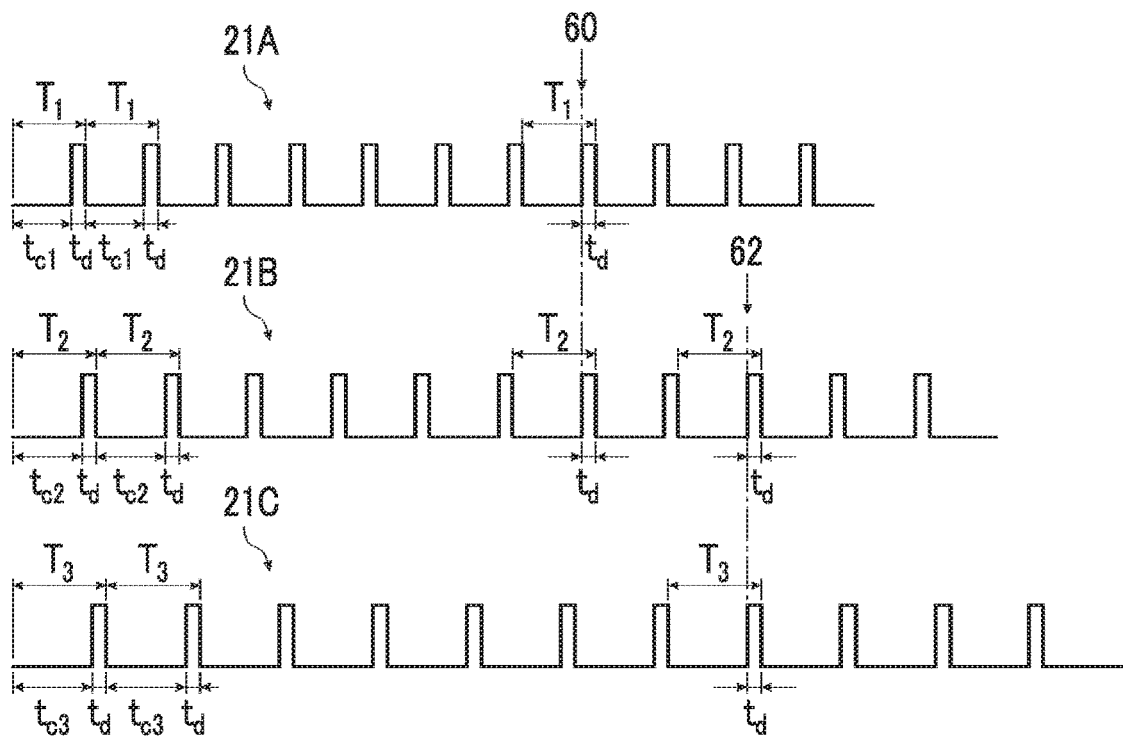
FIG. 4 is a diagram schematically illustrating a timing chart of the information collection system according to the embodiment of the invention.
Figure 5:
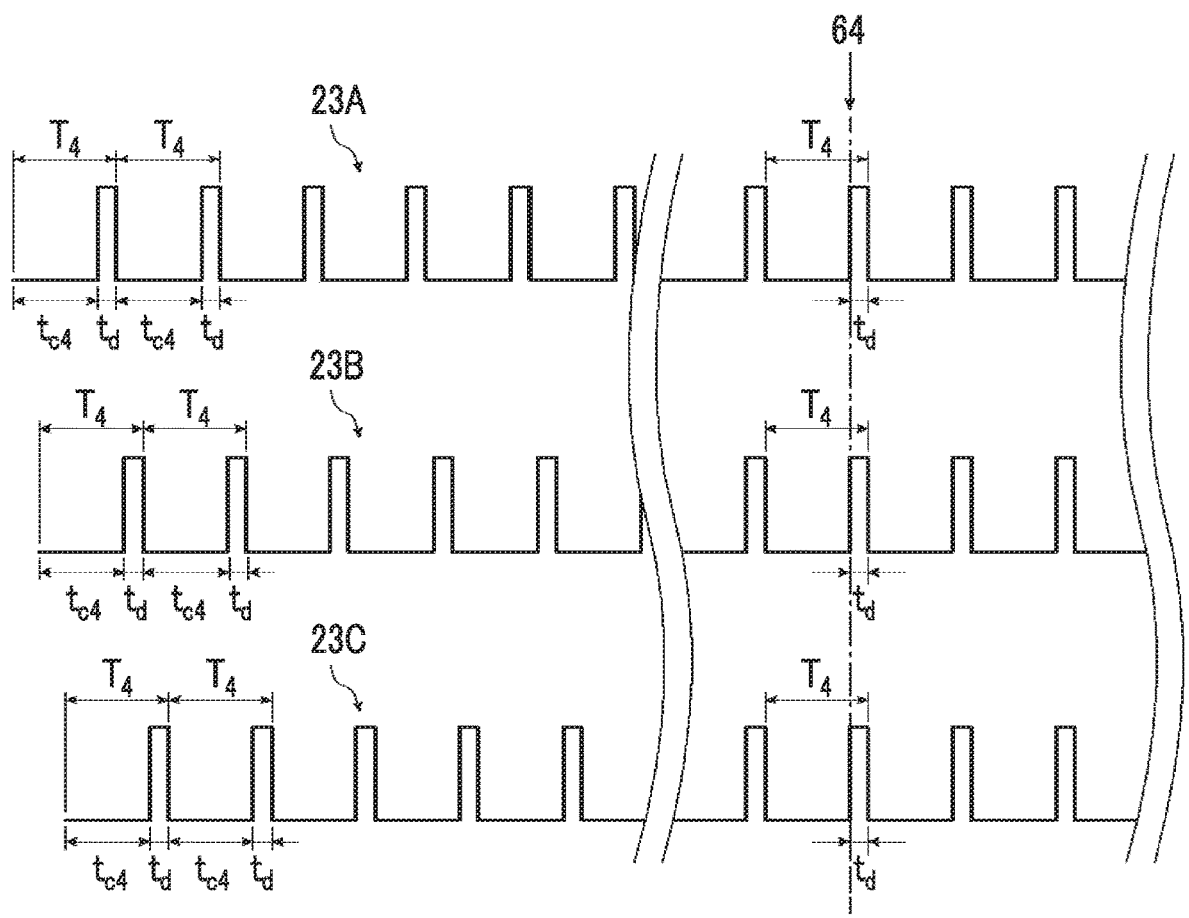
FIG. 5 is a diagram schematically illustrating another example of a timing chart of a radio tag.

FIG. 3 is a diagram schematically illustrating the operation of the information collection system according to the embodiment of the invention. FIG. 4 is a diagram schematically illustrating the timing chart of the information collection system according to the embodiment of the invention. FIG. 5 is a diagram schematically illustrating another example of the timing chart of the radio tags.

In FIG. 4, reference numeral 21A indicates the timing chart of the radio tag 20a, reference numeral 21B indicates the timing chart of the radio tag 20b, and reference numeral 21C indicates the timing chart of the radio tag 20c. The three radio tags 20a, 20b, and 20c have the clock signals with the same frequency, send the measurement data at the same time $t_d$, and send the measurement data with different natural periods. The natural period of the radio tag 20a is $T_1$, the natural period of the radio tag 20b is $T_2$, and the natural period of the radio tag 20c is $T_3$. For example, the ratio of the natural periods of the radio tag 20a, the radio tag 20b, and the radio tag 20c is 7:8:9.

As illustrated in FIG. 3, the reading device 22 transmits the carrier wave ωc to the radio tags 20a to 20c at the same time.

In each of the radio tags 20a to 20c, the rectifying unit 32 obtains a voltage from the carrier wave ωc and the clock generation unit 34 generates a clock signal. The data reading unit 36 acquires the identification information stored in the memory 38 and the temperature information obtained by the sensor 40. The data reading unit 36 reads data at the time when the clock signal starts to be generated or the time when a signal is transmitted from a dedicated start signal generation circuit.

Then, the error detection data calculation unit 44 processes the data of the identification information stored in the memory 38 and the information obtained by the sensor 40 into a data format that can be read by the reading device 22 and obtains the above-mentioned measurement data. The measurement data is output to the data sending unit 46. The information obtained by the sensor 40 is temporarily stored in the memory 38 or is directly transmitted to the error detection data calculation unit 44. The data sending units 46 modulate the measurement data and send the measurement data as radio waves ωta, ωtb, and ωtc from the antennas 30 on the basis of the clock signals of the clock generation units 34.

As described above, since the radio tags 20a to 20c have different natural periods $T_1$ to $T_3$, the count values of the clocks of the clock signals until the measurement data is sent are different from each other. As described above, the radio tags 20a to 20c send the measurement data at the same time $t_d$ and the ratio of the count values is 7:8:9 from the ratio of the natural periods.

As illustrated in FIG. 4, after counting a predetermined number of clocks on the basis of the natural periods $T_1$ to $T_3$, the radio tags 20a to 20c send the measurement data at the time $t_d$. The radio tag 20a sends the measurement data at the time $t_d$ after a time $t_{c1}$ when a predetermined number of clocks are counted within the natural period $T_1$, as represented by the reference numeral 21A in FIG. 4. The radio tag 20b sends the measurement data at the time $t_d$ after a time $t_{c2}$ when a predetermined number of clocks are counted within the natural period $T_2$, as represented by the reference numeral 21B in FIG. 4. The radio tag 20c sends the measurement data at the time $t_d$ after is a time $t_{c3}$ when a predetermined number of clocks are counted within the natural period $T_3$, as represented by the reference numeral 21C in FIG. 4.

The natural period T of the radio tag is the sum of the time $t_c$ when the number of clocks is counted and the time $t_d$ when the measurement data is sent. That is, $T=t_c+t_d$ is established. It is assumed that the measurement data to be transmitted at that time is the previous measurement data or the measurement data stored in the memory 38.

In the timing chart illustrated in FIG. 4, the radio tag 20a and the radio tag 20b start to send the measurement data at the time represented by reference numeral 60. In this case, the reading device 22 receives two measurement data items at the same time and is not capable of identifying the measurement data items sent from the radio tags. Therefore, the reading device 22 does not process the measurement data items.

In addition, the radio tag 20b and the radio tag 20c start to send the measurement data at the time represented by reference numeral 62. In this case, the reading device 22 receives two measurement data items at the same time and is not capable of identifying the measurement data items sent from the radio tags. Therefore, the reading device 22 does not process the measurement data items. As such, even in a case in which the natural periods are different from each other, the measurement data items are likely to be sent at the same time according to the period. In this case, the sent measurement data items are not stored in the storage device 14 and are not used. For this reason, for example, the frequency of the transmission of the carrier wave ωc from the reading device 22 increases to compensate for the loss of the measurement data.

The radio tags 20a to 20c have the same natural period $T_4$. As illustrated in FIG. 5, the radio tags 20a to 20c send the measurement data at the time $t_d$ after a time $t_{c4}$ when a predetermined number of clocks are counted within the natural period $T_4$. However, in a case in which the times when data is sent deviate from each other, the reading device 22 can receive the measurement data from the radio tags 20a to 20c. In order to shift the initial data sending time of the radio tags 20a to 20c, it is necessary to provide a program for delaying the initial data sending time of the radio tags 20a to 20c and sending data at a specific interval after the initial data sending, which results in an increase in costs.

In a case in which, as illustrated in FIG. 5, the data sending times of the radio tags 20a to 20c are matched with each other as represented by reference numeral 64 when the reading device 22 transmits the carrier wave ωc and then transmits the carrier wave ωc again, the reading device 22 is not capable of obtaining data from all of the radio tags 20a to 20c. In FIG. 5, reference numeral 23A indicates the timing chart of the radio tag 20a, reference numeral 23B indicates the timing chart of the radio tag 20b, and reference numeral 23C indicates the timing chart of the radio tag 20c.

As described above, in the information collection system 10, the radio tags 20 are attached to a plurality of containers 24 and the temperature of each container 24 can be measured. In addition, the reading device 22 simultaneously transmits the carrier wave ωc to a plurality of radio tags 20 at a predetermined time interval. Therefore, it is possible to obtain the temperature information of each container 24 in time series and the temperature of each container 24 is stored in time series in the storage device 14. The information terminal 16 reads the radio tag 20 attached to the container 24. With this configuration, it is possible to see the time-series temperature information stored in the storage device 14 and the temperature history of the container 24 is known. Therefore, for example, it is possible to know whether the container 24 has been preserved or transported in an appropriate temperature range. As a result, the information collection system 10 can be used to manage the temperature of, for example, food.

In the information collection system 10, in a case in which the number of radio tags is n, the time when the measurement data is sent is $t_d$, and the natural period of the radio tag is T, it is preferable that $(n^2-n) \times t_d \leq T$ is satisfied. That is, it is preferable that the natural period of the radio tag is set on the basis of the number of radio tags n.

In a case in which the number of radio tags n is 3, $6t_d \leq T$ is satisfied. In a case in which the number of radio tags n is 10, $90t_d \leq T$ is satisfied. In a case in which the number of radio tags n is 50, $2450t_d \leq T$ is satisfied. The time $t_d$ when the measurement data is sent is determined according to the amount of measurement data. In a case in which the measurement target is the same and, for example, temperature is measured, the radio tags send the measurement data at the same time $t_d$. In this case, as the number of radio tags n becomes larger, the natural period becomes longer. As described above, a plurality of radio tags have different natural periods.

As such, in a case in which $(n^2-n) \times t_d \leq T$ is satisfied, a plurality of radio tags 20 are less likely to send the measurement data at the same time.

Since there are a plurality of radio tags 20, the ratio of the natural periods T of each radio tag 20 can be represented by the ratio of the times until the measurement data is initially sent based on one radio tag 20. In addition, it is preferable that the ratio of the natural periods T of each radio tag 20 is the ratio of integers in order to simplify the configuration of each radio tag 20.

In the information collection system 10, as a combination of the natural periods T of the plurality of radio tags 20, the ratio of the natural periods T is preferably the ratio of prime numbers. It is more preferable that the ratio of any two natural periods T is the ratio of prime numbers. In this case, it is possible to prevent the measurement data from being sent at the same time.

For the information collection system 10, the example in which the radio tags 20 measure the temperature of each of a plurality of containers 24 and the reading device 22 reads the measurement result of the temperature and stores the measurement result in the storage device 14 has been described. However, the invention is not limited thereto. The radio tag may not be provided in the container 24, but may be directly attached to a measurement target.

In addition, the radio tag may measure, for example, the humidity of the container 24 instead of the temperature or may measure both the temperature and the humidity. An imaging element may be used as the sensor and the reading device 22 may read an image obtained by the imaging element and store the image in the storage device 14. The radio tag may be used as a surveillance camera.

An illuminance sensor may be used as the sensor, a plurality of radio tags 20 may be provided in a farm, and the reading device 22 may read the sunshine data of the farm and store the sunshine data in the storage device 14. It is possible to investigate a place with a good sunshine situation and a good sunshine condition on the farm.

A temperature sensor may be used as the sensor, the radio tag 20 may be provided in a vinyl greenhouse, and the reading device 22 may read temperature data in the vinyl greenhouse and store the temperature data in the storage device 14. It is possible to investigate a temperature distribution and a temperature variation in the vinyl greenhouse.

An acceleration sensor may be used as the sensor, the radio tags 20 may be provided in a plurality of containers 24, and the reading device 22 may read acceleration data and store the acceleration data in the storage device 14. It is possible to investigate the shaking state of the container 24 during conveyance.

In addition, a radiation sensor may be used as the sensor and the reading device 22 may read the data of the amount of radiation at a plurality of positions and store the data in the storage device 14. In this case, it is possible to investigate the distribution of the amount of radiation and a variation in the amount of radiation. Furthermore, in a case in which the radiation sensor is used as the sensor and the radio tag 20 is attached to the container 24, it is possible to investigate, for example, the leakage of radiation from the container 24.

In addition, a temperature sensor may be used as the sensor to measure, for example, the temperature of a plurality of parts of an animal and a person and the temperature of clothes. In a case in which a pressure sensor is used as the sensor, it is possible to measure, for example, the blood pressure of a plurality of parts of a person.

The radio tag 20 includes, for example, a plurality of transistors. The transistor is not particularly limited and is, for example, a transistor that is formed on a silicon substrate. It is preferable that the radio tag 20 is a thin film transistor (TFT) (hereinafter, simply referred to as a coating-type TFT) in which a coating-type semiconductor is included in a semiconductor active layer. The coating-type TFT has the advantages that it is manufactured at a low temperature and it can be formed by printing. Therefore, it is possible to manufacture the coating-type TFT at a low cost using a resin substrate. In addition, in a case in which coating is used, it is possible to manufacture sensors at the same time. Therefore, it is possible to reduce the manufacturing cost of the radio tag 20.

The coating-type TFT is provided with the semiconductor active layer including the coating-type semiconductor. However, the coating-type TFT may include layers other than the semiconductor active layer.

The coating-type TFT is preferably an organic field effect transistor (hereinafter, simply referred to as an FET) and more preferably an insulated-gate FET in which a gate and a channel are insulated from each other.

The structure of the coating-type TFT is not particularly limited and may be various known structures.

Examples of the structure of the coating-type TFT include a structure in which an electrode, an insulating layer, a semiconductor active layer (organic semiconductor layer), and two electrodes are sequentially provided on an upper surface of a substrate in the lowest layer and a bottom-gate top-contact structure. In this structure, the electrode on the upper surface of the substrate in the lowest layer is provided in a portion of the substrate and the insulating layer is provided so as to come into contact with a portion of the substrate other than the electrode. In addition, the two electrodes provided on the upper surface of the semiconductor active layer are provided so as to be separated from each other. In addition, the structure may be a top-gate top-contact structure.

The transistor forming the radio tag 20 may be a transistor in which a semiconductor layer is made of, for example, an organic semiconductor or an inorganic semiconductor. As described above, the transistor having the semiconductor layer made of an organic semiconductor has the advantage that it can be formed by printing. Therefore, it is preferable that the radio tag 20 includes the transistor having the semiconductor layer made of an organic semiconductor.

In a case in which the semiconductor layer is made of an organic semiconductor, it is easy to manufacture the semiconductor layer, bendability is high, and coating can be performed.

Examples of the organic semiconductor forming the semiconductor layer include a pentacene derivative, such as 6,13-bis(triisopropylsilylethynyl) pentacene (TIPS pentacene), an anthradithiophene derivative, such as 5,11-bis(triethylsilylethynyl) anthradithiophene (TES-ADT), a benzodithiophene (BDT) derivative, a benzothienobenzothiophene (BTBT) derivative, such as dioctylbenzothienobenzothiophene (C8-BTBT), a dinaphthothienothiophene (DNTT) derivative, a dinaphthobenzodithiophene (DNBDT) derivative, a 6,12-dioxaanthanthrene (perixanthenoxanthene) derivative, a naphthalene tetracarboxylic acid diimide (NTCDI) derivative, a perylene tetracarboxylic acid diimide (PTCDI) derivative, a polythiophene derivative, a poly(2,5-bis(thiophen-2-yl)thieno[3,2-b]thiophene) (PBTTT) derivative, a tetracyanoquinodimethane (TCNQ) derivative, oligothiophenes, phthalocyanines, fullerenes, a polyacetylene-based conductive polymer, polyphenylene-based conductive polymers, such as polyparaphenylene and a polyparaphenylene derivative, polyphenylene vinylene, and a polyphenylene vinylene derivative, heterocyclic conductive polymers, such as polypyrrole, a polypyrrole derivative, polythiophene, a polythiophene derivative, polyfuran, and a polyfuran derivative, and ionic conductive polymers, such as polyaniline and a polyaniline derivative.

Among the above-mentioned organic semiconductors, in general, fullerenes, a naphthalene tetracarboxylic acid diimide (NTCDI) derivative, a perylene tetracarboxylic acid diimide (PTCDI) derivative, and a tetracyanoquinodimethane (TCNQ) derivative are used for an N-type organic semiconductor layer and the others are used for a P-type organic semiconductor layer. However, the above-mentioned organic semiconductor becomes a P type or an N type depending on the derivative.

In a case in which the semiconductor layer is made of an organic semiconductor, a method for forming the semiconductor layer is not particularly limited. For example, known methods, such as a coating method, a transfer method, and a vapor deposition method, can be appropriately used.

The thickness of the semiconductor layer is preferably in the range of 1 nm to 1000 nm and more preferably in the range of 10 nm to 300 nm, considering, for example, film formability.

Oxide semiconductors, such as silicon, zinc oxide (ZnO), and In—Ga—$ZnO_4$, can be used as the inorganic semiconductor forming the semiconductor layer.

In a case in which the semiconductor layer is made of the inorganic semiconductor, a method for forming the semiconductor layer is not particularly limited. For example, a coating method and vacuum film forming methods, such as a vacuum vapor position method and a chemical vapor deposition method, can be used. For example, in a case in which the semiconductor layer is formed by a coating method using silicon, cyclopentasilane can be used.

The invention basically has the above-mentioned configuration. The information collection system according to the invention has been described in detail above. However, the invention is not limited to the above-described embodiment and various modifications or changes of the invention can be made without departing from the scope and spirit of the invention.

EXPLANATION OF REFERENCES

10: information collection system
12: information collection unit
14: storage device
16: information terminal
20, 20a, 20b, and 20c: radio tag
21A, 21B, 21C, 23A, 23B, 23C: timing chart
22: reading device
24: container
26: case
30, 50: antenna
32: rectifying unit
34: clock generation unit
36, 54: data reading unit
38: memory
40: sensor
42: conversion unit
44: error detection data calculation unit
46: data sending unit
47: data transmission unit
52: transmission unit
54: data reading unit
56: error check unit
58: data sending unit
59: memory
60, 62, 64: time T, $T_1$, $T_2$, $T_3$, $T_4$: natural period
$t_{c1}$, $t_{c2}$, $t_{c3}$, $t_{c4}$: time
$t_d$: sending time
ωc: carrier wave
ωt, ωta, ωtb, ωtc: radio wave

What is claimed is:

1. An information collection system comprising:
a plurality of radio tags; and
a reading device,
wherein each of the radio tags stores identification information and includes a sensor, an antenna that receives a carrier wave from the reading device, and a data transmission unit that sends measurement data including the identification information and information obtained by the sensor to the reading device after the carrier wave is received by the antenna,
the plurality of radio tags send the identification information and the information obtained by the sensor with different natural periods from the data transmission units,
the reading device transmits the carrier wave to each of the radio tags, receives the measurement data from each of the radio tags, and obtains the measurement data, and
wherein, in a case in which the number of radio tags is n, a time when the measurement data is sent is $t_d$, and the natural period of the radio tag is T, $(n^2-n) \times t_d \leq T$ is satisfied.

2. The information collection system according to claim 1, further comprising:
a storage device,
wherein the measurement data obtained by the reading device from the plurality of radio tags is stored in the storage device.

3. The information collection system according to claim 2, further comprising:
an information terminal that reads the identification information of the radio tag and reads the information obtained by the sensor of the radio tag, whose identification information has been read, from the storage device in time series.

4. The information collection system according to claim 1,
wherein a carrier frequency of the carrier wave of the reading device is equal to or greater than 13 MHz.

5. The information collection system according to claim 2,
wherein a carrier frequency of the carrier wave of the reading device is equal to or greater than 13 MHz.

6. The information collection system according to claim 3,
wherein a carrier frequency of the carrier wave of the reading device is equal to or greater than 13 MHz.

7. The information collection system according to claim 1,
wherein the radio tag includes a transistor in which a semiconductor layer is made of an organic semiconductor.

8. The information collection system according to claim 2,
wherein the radio tag includes a transistor in which a semiconductor layer is made of an organic semiconductor.

9. The information collection system according to claim 3, wherein the radio tag includes a transistor in which a semiconductor layer is made of an organic semiconductor.

10. The information collection system according to claim 4, wherein the radio tag includes a transistor in which a semiconductor layer is made of an organic semiconductor.

* * * * *